Figure 1:
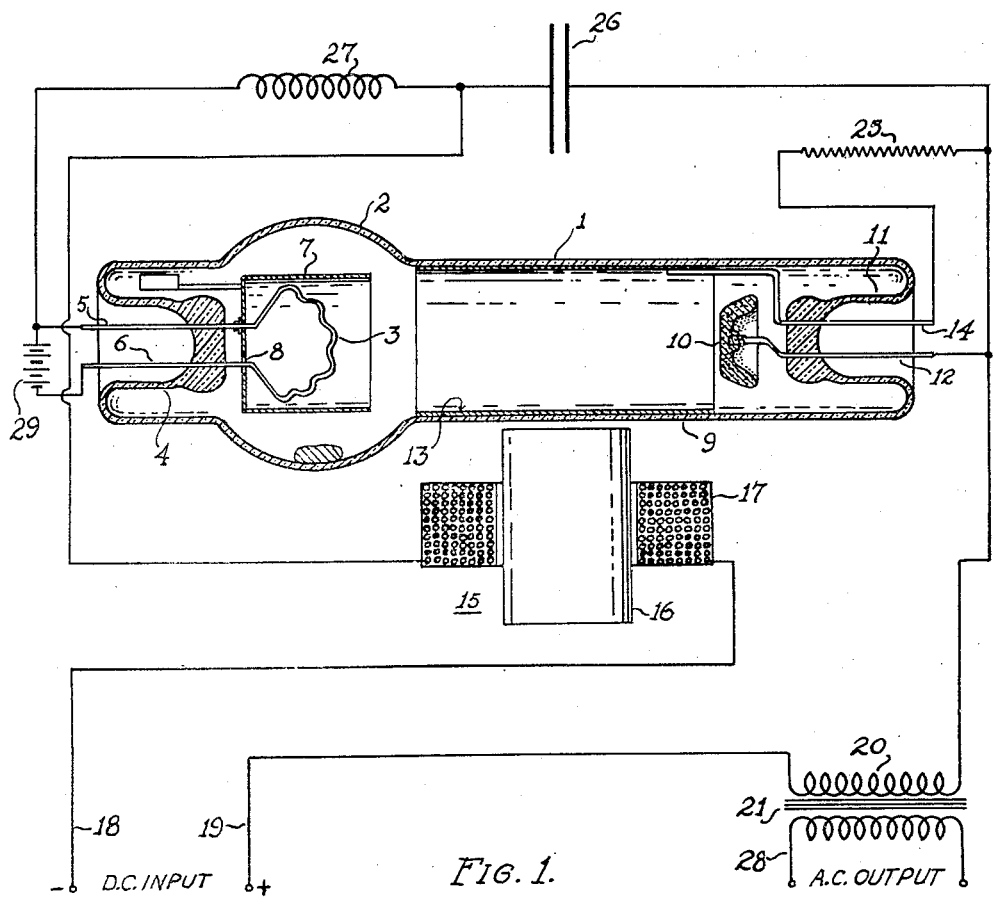

Oct. 6, 1936.  P. L. SPENCER  2,056,412
INVERTER
Filed July 7, 1932   2 Sheets-Sheet 1

INVENTOR
PERCY L. SPENCER
by Elmer J. Gorn
ATTORNEY.

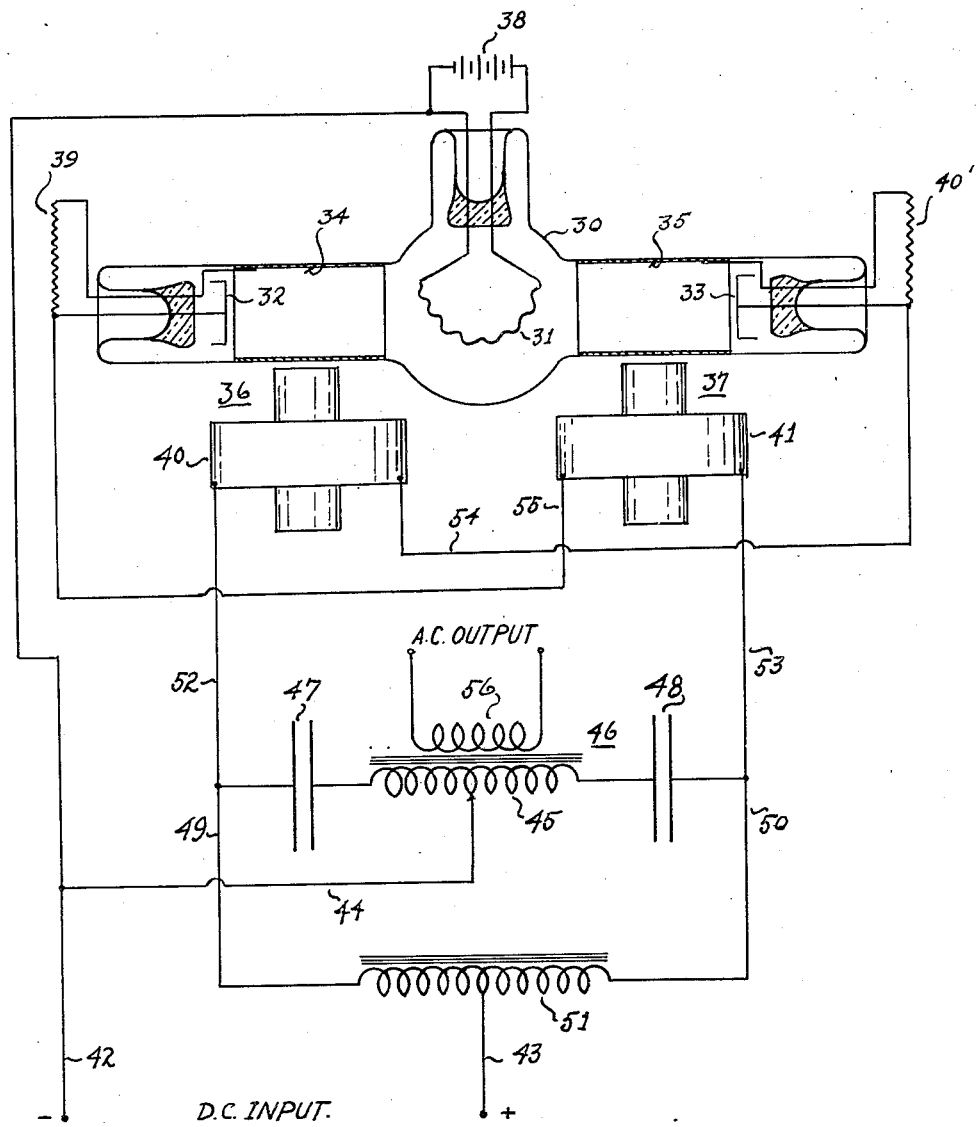

Patented Oct. 6, 1936

2,056,412

UNITED STATES PATENT OFFICE 2,056,412

INVERTER

Percy L. Spencer, West Newton, Mass., assignor, by mesne assignments, to Raytheon Manufacturing Company, Newton, Mass., a corporation of Delaware Application July 7, 1932, Serial No. 621,217

13 Claims. (Cl. 175—363)

This invention relates to an inverter.

One of the objects of this invention is to provide an arrangement for converting direct current to alternating current, and capable of handling large amounts of power without the use of mechanically moving parts.

Another object is to produce such a device in which the alternating current wave shape produced closely approximates a sine wave, and in which the efficiency is comparatively high.

A still further object is to produce such an arrangement utilizing a gaseous conduction tube.

The foregoing and other objects of this invention will be best understood from the following description of an exemplification thereof, reference being had to the accompanying drawings wherein:

Fig. 1 is a diagrammatic showing of one embodiment of my invention, utilizing a preferred type of gaseous conduction tube shown in cross-section; and Fig. 2 is a diagrammatic showing of a different embodiment of my invention.

Devices capable of converting direct current into alternating current without the use of mechanically moving parts and capable of handling large amounts of power have long been sought. Various non-mechanically moving devices for changing direct current to alternating current, such devices being commonly called oscillators or inverters, have been produced, but each of these has contained various important drawbacks. For example, high vacuum thermionic discharge tubes have been designed to generate oscillations, but large amounts of power have been obtained from such devices only with great difficulty. Furthermore, the overall efficiency of such an oscillator is comparatively low. A number of other devices of this general nature have been constructed, but in some cases the efficiency has been quite low, while other such devices are unstable over large ranges in load variation. In my present invention I have discovered an arrangement with which direct current energy of high power may be converted into alternating current energy having a wave shape closely approximating a sine wave with comparatively high efficiencies, and which is stable over large load variations.

In Fig. 1, I represents a hermetically sealed glass envelope having an enlarged chamber 2 at one end thereof within which is supported a thermionic cathode 3 at the inner end of a reentrant stem 4. The cathode 3 is supported by two lead-in wires 5 and 6, which pass through and are sealed in the inner end of the reentrant stem 4. The cathode preferably comprises a metallic filament, such as, for example, nickel coated with some material to increase the electron emissivity of said filament. Such a coating may consist, for example, of the alkali earth metal oxides. I prefer to place a shield 7 around the filament 3. This shield 7 may consist of thin sheet metal material, such as, for example, nickel, and is supported on one of the cathode lead-in wires 5. The other cathode lead-in wire 6 passes through an opening 8 in the lower wall of said shield 7. The end of the shield 7 opposite the reentrant stem 4 is open, allowing the electrons emitted from the filament 3 to pass out into the discharge space within the tube 1. The shield 7 intercepts particles thrown off from the filament 3, and prevents their disposition on the walls of the chamber 2. Thus the walls of this chamber are prevented from being blackened by a metallic deposit thereon. In addition, the shield 7 prevents undue loss of heat from the filament 3, and enables it to be operated more efficiently. The lower wall of shield 7 protects the reentrant stem 4 from energy liberated within the discharge space. The cathode is provided with heating current from some suitable source, such as, for example, a battery 29 connected between the wires 5 and 6. Of course it is to be understood that any type of cathode may be used instead of the specific cathode, as described above. At the opposite side of the chamber 2 from the stem 4, the envelope is formed to provide an elongated tubular section 9. At the opposite end of this tubular section from the cathode 3 is provided a cooperating anode 10 supported at the inner end of a reentrant stem 11. The anode 10 is preferably supported by an anode lead 12 passing through and being sealed in the end of said stem 11. The anode 10 is formed of some suitable refractory conducting material, such as, for example, graphite, carbon, carbonized nickel, or tantalum. Interposed between the cathode 3 and the anode 10 and surrounding the discharge between them is provided a conductive tubular member 13. This tubular member is made of a non-magnetic material, and preferably comprises a cylinder of thin sheet metal, such as, for example, tantalum. The tubular member 13 preferably fits snugly within the glass tubular section 9, whereby said tubular member is supported by the walls of said tubular section. While member 13 is shown as an imperforate tubular sleeve, it can assume any other form as long as it consists of a conducting material positioned adjacent the path through the tubular section 9. Preferably the member 13 should at least partially surround said path through said tubular section. A lead-in wire 14, also sealed through the end of the reentrant stem 11 and electrically connected to the tubular member 13, affords an external electrical connection to said tubular member. In order to lead off the current carriers which the tubular member 13 collects from the discharge space, the wire 14 is connected to the anode lead 12. To keep the amount of current flowing to the tubular member 13 to a very small value a high resistance 25 is preferably inserted in this connection. In order to control the discharge through the tube, I provide means for applying a magnetic field transversely to the discharge path between the anode 10 and the cathode 3. This means may consist of an electro-magnet 15, comprising a core 16 and an exciting coil 17. The electromagnet 15 is disposed externally to the envelope 1 adjacent the tubular section 9 containing the tubular member 13.

When the filament 3 is supplied with heating current from the battery 29, so that its temperature is raised to the electron emissive point and a voltage is applied between the cathode and the anode, an intense ionizing discharge will ordinarily pass between these two electrodes if the potential is applied so as to make the anode positive. The potential, however, must rise beyond a definite comparatively low voltage before such a discharge will be initiated. This potential is termed the starting voltage of the tube, and in the particular arrangement which I have illustrated may be in the neighborhood of ten volts. When a transverse magnetic field is applied to the space within the tubular section 9, electrons coming from the cathode 3 are forced over against the tubular member 13 and are led out of the tube through conductor 14. Since the start of a discharge through the tube depends largely on the presence of electrons in the discharge space, the loss of electrons due to the magnetic field and the members 13 raises the starting voltage of the tube. When the magnetic field is above a certain rather critical value, the loss of electrons is so great that cumulative ionization along the discharge space does not occur and the discharge will not start even though the full potential is applied across the tube. In one of the tubes which I have constructed in accordance with the above disclosure, this value of field was about thirty gauss. Of course it is to be understood that wherever I cite particular values, such are not to be construed in any limiting sense inasmuch as they are merely given as examples, and may be subjected to wide variations. The tube, as described above, variations thereof, and a more complete description of the manner in which the tube operates are contained in my co-pending application, Serial No. 612,235, filed May 19, 1932, in which said tube is claimed.

I have discovered that the above tube is ideally suited for use in my new converting circuit, and that by suitably connecting said tube in said circuit it can be made to convert direct current into alternating current. A preferred arrangement of such a circuit will be described below. Two conductors 18 and 19 are provided which are adapted to be connected to a source of direct current. The coil 17 of the magnet 15, a condenser 26, and the primary 20 of an output transformer 21 are connected in series with the conductors 18 and 19 across the source of direct current. The discharge tube is connected across the condenser 26. In order to limit the rushes of current through the tube, an inductance 27 is interposed in this latter connection. The connection may lead from one side of the condenser 26 through the inductance 27 to one of the cathode leads 5, and from the other side of the condenser 26 to the anode lead 12. The transformer 21 is provided with a secondary 28 which is adapted to be connected to any desired alternating current load.

In the arrangement as described above, when the proper values for the various elements are selected and a direct current source is connected between the conductors 18 and 19, an alternating current will flow in the load connected to the secondary 28 of the output transformer 21. In one of the systems which I have constructed in accordance with the above disclosure, I used a condenser 26 which consisted of a capacity of about four micro-farads, the coil 17 of an inductance of about .05 henries, and a coil 27 of an inductance of about .005 henries.

According to my present understanding of the theory of operation of the above device, it operates as follows. When a direct current voltage is impressed across the conductors 18 and 19, a charging current starts to flow through the circuit, including the condenser 26 and the coil 20. Due to the presence of the inductive coil 17, the entire voltage is not immediately impressed upon the condenser 26, but builds up rather slowly. Likewise, since the discharge tube is connected directly across the condenser 26, the voltage applied to the discharge tube builds up somewhat slowly. The charging current which starts to flow through the coil 17 produces a magnetic field in the core 16. This magnetic field being applied to the discharge space within the tubular member 13 prevents the discharge from starting even after the voltage between the anode and cathode is built up beyond the normal starting voltage of the tube. As the voltage builds up across the condenser 26, the charging current flowing to said condenser decreases. This decrease in current through the condenser 26 causes a decrease in the magnetic field of the core 16. When the charging current and consequently the magnetic field has fallen below the critical value, as stated above, the discharge through the tube is enabled to start. It will be seen that at this time substantially the full voltage of the source is impressed across the cathode and anode. Upon the discharge starting through the tube, intense ionization occurs therein and the discharge path between the anode and cathode, which up to this point was highly insulating, becomes conductive, and the resistance thereof drops to a very low value. The effect of this is to connect across the condenser 26 a low resistance through which the condenser 26 immediately discharges. The presence of the inductive coil 27 in the condenser discharge circuit prevents an abnormal rush of current from flowing through the discharge tube. The presence of the inductive coil 27 and the fact that the discharge path through the tube is of very low resistance, makes the resulting circuit an oscillating one. Thus the discharge current flowing from the condenser 26 will entirely discharge it and charge it in the opposite direction. When, however, the current in the circuit tends to reverse the discharge, the tube being a unilaterally conducting device will not permit such a reversal of current and the discharge through the tube will cease. This in effect is an opening of the low resistance conductive circuit which was heretofore connected across the condenser. The rate at which the condenser 26 discharges through the tube depends substantially upon the inductance 27 and the capacity 26. This is ordinarily a comparatively high frequency as compared with the natural frequency of the circuit, including the coil 17 and the condenser 26. Thus the period in which condenser 26 is discharged through the tube is so short that the current through the inductive coil 17 will not have an opportunity to build up to any appreciable degree. Since the current cannot flow from the condenser through the tube in the reverse direction, the D. C. voltage applied between the conductors 18 and 19 and the potential existing across the condenser 26 will cause said condenser to discharge through the circuit, including the coil 17, the condenser 26, and the primary coil 20, and to charge up in the opposite direction to substantially the value of the voltage of the D. C. During this period of discharge and charge, due to the current flowing in the coil 17, the tube will be non-conductive, as explained above. At the end of this period when the current through the coil 17 has fallen to a comparatively negligible value, the tube will again become conductive, whereupon the condenser 26 again discharges therethrough. The result of the above operation is to produce a series of current impulses through the coil 20, which impulses rise from a substantially negligible value to a maximum, and then back to said substantially negligible value. Thus across the secondary 28 there will appear an alternating current whose frequency will be equal to the frequency of said current pulsations. This frequency will depend for the most part upon the values of the inductance 17 and the capacity 26. I have found that not only does the arrangement, as described above, produce an alternating voltage across the secondary 28, but that the shape of the voltage wave even under heavy load is substantially a sine wave.

In the above arrangement, in the main charging circuit, comprising the coil 17 and the condenser 26, there is very little resistance so that the losses in this circuit are kept to a minimum. In the condenser discharge circuit, containing the discharge tube and the inductance 27, merely the resistance of this inductance and the drop through the tube introduces losses. Since the resistance of the coil 27 can be kept very low and since the gaseous discharge tubes can be made with extremely low voltage drops, the loss introduced in this circuit is likewise a very small amount. Due to this fact, the overall efficiency of the system is comparatively high. Of course the inductance coil 27 could be placed in the main charging circuit, including the coil 17. Under these conditions, however, its resistance would be included in the circuit both during the charging and the discharging of the condenser 26, and therefore additional losses would occur. It is for this reason that I prefer to place the coil 27 outside of the main charging circuit, and merely in the discharge circuit where it can perform its function of keeping the current surges through the tube within reasonable values.

Instead of using a tube with but a single cathode and anode, it is possible to use a tube with any desired number and combination of electrodes. Such an arrangement may be that which is shown diagrammatically in Fig. 2, in which a single cathode cooperates with two anodes. This figure also shows another circuit arrangement embodying my invention. In Fig. 2, 30 represents a hermetically sealed glass envelope similar to that shown in Fig. 1. This envelope contains a single cathode 31 cooperating with two anodes 32 and 33. Between the cathode and these anodes are placed tubular members 34 and 35, respectively. These tubular members are similar to the member 13 in Fig. 1, and control the discharge between the cathode and each of the anodes in a similar manner. In order to introduce magnetic fields into the discharge space within the tubular members 34 and 35, electromagnets 36 and 37, respectively, are provided. These magnets are energized by the coils 40 and 41, respectively. The cathode 31 may be provided with heating current from some suitable source, such as a battery 38, while each of the tubular members 34 and 35 are connected to other respective anodes through resistances 39 and 40, respectively. A preferred arrangement of circuit in which the tube shown in Fig. 2 can be used will be described below.

Two conductors 42 and 43 are provided which are adapted to be connected to a source of direct current. A connection 44 is provided leading from the conductor 42 to the midpoint of the primary 45 of an output transformer 46. The opposite ends of the primary 45 are each connected to one side of the condensers 47 and 48, respectively. Two conductors 49 and 50 lead from the other sides of the condensers 47 and 48, respectively, to the opposite ends of a choke coil 51. The conductor 43 is connected to a point intermediate the ends of the coil 51. Conductors 52 and 53 lead from the conductors 49 and 50 to one terminal of the coils 40 and 41, respectively. The opposite terminal of the coil 40 is connected by means of a conductor 54 to the anode 33, while the opposite terminal of the coil 41 is connected by means of a conductor 55 to the anode 32. The conductor 42 is connected directly to the cathode 31. An output secondary 56 is provided on the transformer 46. When the cathode is energized from the source of potential 38 and the source of direct current is applied to the conductors 42 and 43, an alternating current will flow in a load connected to the secondary 56 of the output transformer 46. The theory of operation of the circuit, as shown in Fig. 2, according to my present understanding thereof, is substantially as follows.

When a direct current voltage is impressed across the conductors 42 and 43, a charging current will flow through the condensers 47 and 48, respectively, whereby each is charged up substantially to the value of the applied potential. At the same time the direct current potential is applied between the cathode 31 and the anode 32 as follows. One side of the direct current line 42 goes directly to the cathode 31. The other side of the line goes from the conductor 43 through one-half of the choke coil 51, conductors 50, 53, coil 41, conductor 55 to the anode 32. The same potential is applied between the cathode 31 and the other anode 33, due to the connection leading from the conductor 43 through one-half of the choke coil 51, conductors 49, 52, coil 40, conductor 54, to the anode 33. In charging condensers 47 and 48, because of the presence of considerable inductance in the connection to each of the anodes, the voltage between the cathode and each of the anodes builds up somewhat slowly. However, when the voltage has risen to the starting potential of the tube, the tube will become conducting. Since it will be practically impossible to balance exactly both sides of the tube and the circuits connected thereto, the discharge path between the cathode 31 and one of the anodes will break down before the other one starts to conduct. Let us assume, for example, that the discharge path between the cathode 31 and the anode 32 is the one which first becomes conducting. When this occurs, the condenser 48 which has been charged by the potential applied to the conductors 42 and 43 will discharge through the above discharge path through the following circuit: from one side of the condenser 48 through the conductor 53, coil 41, conductor 55, anode 32, discharge path through tube 34, cathode 31, conductors 42, 44, one-half of primary 45, back to the other side of the condenser 48. It will be noted that this discharge current flows through the coil 41 and creates a magnetic field within the tubular member 35. As explained above, this magnetic field will raise the starting voltage between the cathode 31 and the anode 33 through the tubular member 35. Thus a discharge will not be able to start through tubular member 35 until the current flowing through the coil 41 has fallen to a negligible value. Since the discharge path of the condenser 48 contains very little resistance, its discharge will tend to be an oscillatory one. Therefore, when the current through the coil 41 has fallen to said negligible value, the condenser 48 will be fully discharged and charged in the opposite direction. At this point the current in said discharge circuit will tend to reverse. However, since the discharge path between the cathode 31 and the anode 32 is a unilaterally conducting one, such a reversal of current cannot occur, and the discharge between the cathode and said anode 31 ceases. It is substantially at this point that the magnetic field of the magnet 31 has fallen to such a value that the discharge from the cathode 31 to the anode 33 is enabled to start. Since the period during which the condenser 48 has been discharging is sufficient for the applied potential to have built up between the cathode 31 and the anode 33, a discharge will start between said cathode and anode as soon as the current through the coil 41 has fallen to said negligible value. Upon the start of this discharge, the condenser 47 will be discharged through the following circuit: from one side of the condenser 47 through conductor 52, coil 40, conductor 54, anode 33, discharge path through the tubular member 35, cathode 31, conductor 42, conductor 44, one-half of the primary 45, back to the other side of the condenser 47. The condenser 47 similarly to the condenser 48 will fully discharge through this circuit, and will be charged up in the opposite direction. When, however, the current tends to reverse through its discharge path, such a reversal is prevented because of the unilaterally conducting path between the cathode 31 and the anode 33. However, the discharge current from the condenser 47 flows through the coil 40, which sets up a magnetic field within the tubular member 34, and prevents a discharge from starting through said tubular member until said discharge current has fallen to a predetermined negligible value. Since the discharge path of the condenser 48 passes through said tubular member 34, said condenser 48 will be completely charged by the potential applied to the conductors 42 and 43, while the condenser 47 is discharged. However, the discharge of the condenser 48 is prevented, due to the magnetic field of the coil 40. When, however, the condenser 47 is fully discharged and charged up in the reverse direction, the condenser 48 is enabled to be discharged through its discharge path, whereupon it will prevent a discharge of the condenser 47 until its discharge current has fallen to a negligible value. The alternate charging and discharging of the condensers 47 and 48 produce alternating current impulses through the two halves of the primary winding 45 which will produce an alternating voltage in the output secondary 56, at a frequency largely dependent on the value of the capacities of condensers 47 and 48 and the inductance of coils 40 and 41. Since the current which flows in the primary coil 45 is itself an alternating one, the load could be fed directly from the output circuit without the interposition of such an output transformer as 46. In order to prevent excessive charging current impulses from flowing to the condensers 47 and 48, a portion of the choke coil 51 is included in the charging circuits thereof, and thus determines the rate at which these condensers will be charged. This coil may have any value of inductance which keeps the amplitude of the charging current impulses to the condensers 47 and 48 within reasonable limits. Preferably the inductance is of such a value that one condenser becomes fully charged during the period of the discharge of the other condenser. The choke coil 51 also prevents the full potential applied across the conductors 42 and 43 from being impressed across the respective discharge paths of the tube when these discharge paths have become conducting. If some such means were not provided, this applied potential might tend to keep the discharge passing through the tube once such discharge is started. Of course the inductance of the coils 40 and 41 are interposed between the source and the discharge paths through the tube. However, the inductance of these coils may not be sufficient to perform the required function, and therefore the extra inductance 51 must be supplied. Since in the discharge path of each of the condensers 47 and 48 there is considerable inductance, the provision of an additional inductance, such as 27 of Fig. 1, to limit the amplitude of the discharge current impulses, is unnecessary. Due to the fact that the discharge current through each of the condensers controls the discharge of the other condenser, the reversal of current through each condenser and its associated portion of the primary winding 45 occurs at exactly the same time. The result of such an arrangement is to produce an alternating current having a wave shape closely approximating a sine wave.

The invention is not limited to the particular details of construction, materials, and processes described above as many equivalents will suggest themselves to those skilled in the art. For example, in Fig. 1, instead of having all of the inductance of the main charging circuit concentrated in the coil 17, an additional inductance may be supplied in series therewith. Such additional inductance may exist in the transformer 21 which if it has considerable leakage flux will introduce an appreciable inductance into the main charging circuit. Also the tubular members 13, 34, and 35 need not be connected to the anode through a resistance, but may be entirely free or biased by the introduction of suitable biasing potential into the connection between said tubular member and the anode. Also various other changes in my system will suggest themselves.

It is accordingly desired that the appended claims be given a broad interpretation commensurate with the scope of the invention within the art.

What is claimed is:

1. In an inverter, a circuit including a capacity, a source of direct current, and an output arrangement connected in series, a space discharge device connected across said capacity, said space discharge device comprising a gas-filled envelope enclosing a thermionic cathode and an anode between which an ionizing discharge is adapted to take place, means for impressing a magnetic field transversely upon the discharge space between said thermionic cathode and anode, said discharge space being non-conducting at all values of said magnetic field above a predetermined value, and means responsive to the current flowing in said circuit for controlling the magnitude of said field so that it is above said predetermined value until said current falls to a relatively small proportion of its maximum value.

2. In an inverter, a circuit including a capacity, a source of direct current, and an output arrangement connected in series, a space discharge device connected across said capacity, said space discharge device comprising a gas-filled envelope enclosing electrodes between which an ionizing discharge is adapted to take place, a metallically conducting member positioned adjacent the discharge space between said electrodes and at least partially surrounding said discharge space, means for impressing a magnetic field transversely upon the discharge space between said electrodes, said discharge space being non-conducting at all values of said magnetic field above a predetermined value, and means responsive to the current flowing in said circuit for controlling the magnitude of said field so that it is above said predetermined value until said current falls to a relatively small proportion of its maximum value.

3. In an inverter, a circuit including a capacity, a source of direct current, and an output arrangement connected in series, a space discharge device connected across said capacity, said space discharge device comprising a gas-filled envelope enclosing a cathode and an anode, a metallically conducting member positioned adjacent the discharge space between said electrodes, means for impressing a magnetic field transversely upon the discharge space between said electrodes, said discharge space being non-conducting at all values of said magnetic field above a predetermined value, and means responsive to the current flowing in said circuit for controlling the magnitude of said field so that it is above said predetermined value until said current falls to a relatively small proportion of its maximum value.

4. In an inverter, a circuit including a plurality of capacities connected in parallel with each other across a source of direct current, an output arrangement operatively associated with said circuit, a plurality of space discharge paths, each connected across one of said capacities and through which said capacities are adapted to discharge, and means responsive to the current flowing in the discharge circuit of each of said capacities for preventing the space discharge path included in the discharge path of the other of said capacities from becoming conductive until the current in said first-named discharge path falls to a relatively small proportion of its maximum value.

5. In an inverter, a circuit including a plurality of capacities connected across a source of direct current, an output arrangement operatively associated with said circuit, a plurality of space discharge paths, each connected across one of said capacities and through which said capacities are adapted to discharge, means for impressing a magnetic field upon each of said space discharge paths, each of said space discharge paths being non-conducting at all values of magnetic field above a predetermined value, and means responsive to the current flowing in the discharge circuit of each of said capacities for controlling the magnitude of the field impressed on the other of said space discharge paths so that it is above said predetermined value until said current falls to a relatively small proportion of its maximum value.

6. In an inverter, a source of direct current, a single unidirectional, current-conducting, space discharge device connected across said source, a condenser also connected across said source and said space discharge device, whereby said condenser is adapted to be charged from said source, means responsive to the charging current flowing to said condenser for preventing said space discharge device from becoming conductive until said charging current falls to a relatively small proportion of the maximum value, whereupon said condenser is adapted to discharge through said space discharge device, means in series with said source and space discharge device to prevent current from said source from building up through said space discharge device during the period when said condenser discharges through said space discharge device, and an output arrangement operatively associated with the charging circuit of said condenser.

7. In an inverter, a source of direct current, a single unidirectional, current-conducting, space discharge device connected across said source, a condenser also connected across said source and said space discharge device, an inductance in series with said source, space discharge device and condenser, whereby said condenser is adapted to be charged from said source through said inductance, means responsive to the charging current flowing through said inductance for preventing said space discharge device from becoming conductive until said charging current falls to a relatively small proportion of the maximum value, whereupon said condenser is adapted to discharge through said space discharge device, said inductance also constituting means to prevent current from said source from building up through said space discharge device during the period when said condenser discharges through said space discharge device, and an output arrangement operatively associated with the charging circuit of said condenser.

8. In an inverter, a source of direct current, a single unidirectional, current-conducting, space discharge device connected across said source, a condenser also connected across said source and said space discharge device, whereby said condenser is adapted to be charged from said source, means responsive to the charging current flowing to said condenser for preventing said space discharge device from becoming conductive until said charging current falls to a relatively small proportion of the maximum value, whereupon said condenser is adapted to discharge through said space discharge device, means in the discharge circuit of said condenser for limiting the magnitude of any discharge current surges through said space discharge device, means in series with said source and space discharge device to prevent current from said source from building up through said space discharge device during the period when said condenser discharges through said space discharge device, and an output arrangement operatively associated with the charging circuit of said condenser.

9. In an inverter, a circuit including a capacity, a source of direct current, and an output arrangement connected in series, a discharge circuit connected across said capacity, said discharge circuit including a space discharge device, control means for preventing a discharge from starting through said space discharge device, said control means comprising means for impressing a magnetic field upon said space discharge device, said control means being adapted to prevent a discharge from starting through said space discharge device at all values of said magnetic field above a predetermined value, and means responsive to the current flowing in said first-named circuit for controlling the magnitude of said field so that it is above said predetermined value until said current falls to a relatively small proportion of its maximum value.

10. In an inverter, a circuit including a capacity, a source of direct current, and an output arrangement connected in series, a discharge circuit connected across said capacity, said discharge circuit including a space discharge device, said space discharge device comprising a gas-filled envelope enclosing electrode between which an ionizing discharge is adapted to take place, control means for preventing a discharge from starting through said space discharge device, said control means comprising means for impressing a magnetic field transversely upon the discharge space between said electrodes, said control means being adapted to prevent a discharge from starting through said discharge space at all values of said magnetic field above a predetermined value, and means responsive to the current flowing in said first-named circuit for controlling the magnitude of said field so that it is above said predetermined value until said current falls to a relatively small portion of its maximum value.

11. In a inverter, a circuit including a capacity, a source of direct current, and an output arrangement connected in series, a discharge circuit connected across said capacity, said discharge circuit including a space discharge device, said space discharge device comprising a gas-filled envelope enclosing electrodes between which an ionizing discharge is adapted to take place, control means for preventing a discharge from starting through said space discharge device, said control means comprising a metallically conducting member positioned adjacent the discharge space between said electrodes, and means for impressing a magnetic field transversely upon the discharge space between said electrodes, said control means being adapted to prevent a discharge from starting through said discharge space at all values of said magnetic field above a predetermined value, and means responsive to the current flowing in said first-named circuit for controlling the magnitude of said field so that it is above said predetermined value until said current falls to a relatively small proportion of its maximum value.

12. In an inverter, a source of direct current, capacity means adapted to be charged from said source of direct current, a discharge circuit for periodically discharging said capacity means comprising a space discharge tube having a cathode and an anode, control means for preventing a discharge from starting through said space discharge device between said cathode and anode, said control means comprising means for impressing a magnetic field upon said space discharge device, said control means adapted to prevent a discharge from starting through said space discharge device between said cathode and anode at all values of said magnetic field above a predetermined value, means for energizing said magnetic means with unidirectional current pulsations out of phase with the current pulsations through said discharge circuit, and output means associated with the charging circuit of said capacity.

13. In an inverter, a source of direct current, a capacity, a charging circuit for said capacity through which unidirectional current impulses are adapted to pass, an output arrangement connected in said charging circuit, a space discharge device connected across said capacity, said space discharge device comprising a gas-filled envelope enclosing electrodes between which an ionizing discharge is adapted to take place, control means for preventing a discharge from starting through said space discharge device, said control means comprising means for impressing a magnetic field upon said space discharge device, said control means being adapted to prevent a discharge from starting through said space discharge device at all values of magnetic field above a predetermined value, and means responsive to the current flowing in said charging circuit for controlling the magnitude of said field so that it is above said predetermined value until said current falls to the relatively small proportion of its maximum value.

PERCY L. SPENCER.